(12) United States Patent
Suzuki et al.

(10) Patent No.: US 11,654,730 B2
(45) Date of Patent: May 23, 2023

(54) TIRE SYSTEM

(71) Applicant: DENSO CORPORATION, Kariya (JP)

(72) Inventors: Yoichiro Suzuki, Nisshin (JP); Takatoshi Sekizawa, Kariya (JP); Kenichiro Sanji, Nisshin (JP); Naohito Takasuka, Nisshin (JP)

(73) Assignee: DENSO CORPORATION, Kariya (JP)

( * ) Notice: Subject to any disclaimer, the term of this patent is extended or adjusted under 35 U.S.C. 154(b) by 302 days.

(21) Appl. No.: 16/895,040

(22) Filed: Jun. 8, 2020

(65) Prior Publication Data

US 2020/0298635 A1 Sep. 24, 2020

Related U.S. Application Data

(63) Continuation of application No. PCT/JP2019/001310, filed on Jan. 17, 2019.

(30) Foreign Application Priority Data

Jan. 19, 2018 (JP) .............................. JP2018-007425

(51) Int. Cl.
*B60C 23/04* (2006.01)

(52) U.S. Cl.
CPC ................................ *B60C 23/0479* (2013.01)

(58) Field of Classification Search
CPC . B60C 23/0479; B60C 23/0488; B60C 19/00; B60W 40/068
See application file for complete search history.

(56) References Cited

U.S. PATENT DOCUMENTS

| | | | | |
|---|---|---|---|---|
| 4,319,220 A | * | 3/1982 | Pappas | B60C 23/0479 340/447 |
| 4,939,656 A | * | 7/1990 | Hoashi | B60T 8/175 701/84 |
| 6,414,592 B1 | * | 7/2002 | Dixit | B60C 23/0472 340/447 |
| 10,075,819 B2 | * | 9/2018 | Santavicca | H04B 17/27 |
| 2003/0128109 A1 | * | 7/2003 | Andou | B60C 23/0408 340/442 |

(Continued)

FOREIGN PATENT DOCUMENTS

| | | |
|---|---|---|
| JP | 2005212669 A | 8/2005 |
| JP | 2007022384 A | 2/2007 |

(Continued)

*Primary Examiner* — Curtis J King
(74) *Attorney, Agent, or Firm* — Harness, Dickey & Pierce, P.L.C.

(57) ABSTRACT

A tire system is configured to enable a general-purpose communication device to establish data communication with a tire-side device, thereby enabling transmission of data indicating a tire-related condition from the tire-side device to the general-purpose communication device. The general-purpose communication device acquires the tire-related condition, and reports the tire-related condition to the user via a notification unit. Based on the above, it is possible to report the tire-related condition via the general-purpose communication device based on the communication between the general-purpose communication device and the tire-side device.

2 Claims, 7 Drawing Sheets

(56) References Cited

U.S. PATENT DOCUMENTS

| | | | |
|---|---|---|---|
| 2003/0197606 A1* | 10/2003 | Epstein | B60Q 1/54 340/466 |
| 2007/0279204 A1* | 12/2007 | Adar | B60C 23/0427 340/447 |
| 2008/0001729 A1* | 1/2008 | Kyllmann | B60C 23/0408 340/445 |
| 2008/0272897 A1* | 11/2008 | Honkonen | B60R 25/1004 340/429 |
| 2012/0013458 A1 | 1/2012 | Kanenari | |
| 2012/0119895 A1* | 5/2012 | Deniau | B60C 23/0479 340/442 |
| 2012/0139751 A1* | 6/2012 | Lin | B60C 23/0479 340/870.07 |
| 2015/0191056 A1* | 7/2015 | Mori | B60C 23/0489 73/382 R |
| 2015/0210286 A1 | 7/2015 | Hanatsuka et al. | |
| 2015/0239307 A1* | 8/2015 | Horikoshi | G01L 17/00 340/442 |
| 2018/0118209 A1 | 5/2018 | Suzuki et al. | |
| 2018/0178601 A1* | 6/2018 | Surendra | B60C 23/0471 |
| 2018/0229560 A1* | 8/2018 | DeCia | B60C 23/045 |
| 2018/0264894 A1* | 9/2018 | Goto | B60W 40/06 |
| 2019/0047574 A1* | 2/2019 | Nishi | G08G 1/096741 |

FOREIGN PATENT DOCUMENTS

| | | |
|---|---|---|
| JP | 2012022433 A | 2/2012 |
| JP | 2014035279 A | 2/2014 |
| JP | 2016112967 A | 6/2016 |

* cited by examiner

TIRE SYSTEM

CROSS REFERENCE TO RELATED APPLICATION

This application is a continuation application of PCT/JP2019/001310 filed on Jan. 17, 2019 based on Japanese Patent Application No. 2018-7425 filed on Jan. 19, 2018. The whole disclosures of both of the above applications are incorporated herein by reference.

FIELD

The present disclosure relates to a tire system that detects a vibration received by a tire by a tire-side device and determines a tire-related condition such as a road surface condition and a tire condition based on vibration data.

BACKGROUND

A conventional road surface condition determination device includes an acceleration sensor attached to a rear surface of a tire tread to detect a vibration applied to the tire, and estimates a road surface condition based on a detection result of the vibration. This road surface condition determination device estimates the road surface condition by generating data representing a road surface condition based on a vibration waveform of the tire detected by the acceleration sensor and transmitting the data of each road wheel to a vehicle body-side receiver and the like.

The above road surface condition determination device is originally mounted on the vehicle when the vehicle is sold.

The road surface condition is exemplified to be a tire-related condition. The tire-related condition includes, in addition to the road surface condition, a tire air pressure, a wear of the tire and the like.

SUMMARY

A tire system according to the present disclosure comprises a tire-side device provided in each of plural tires of a vehicle and a general-purpose communication device used as a device separate from the vehicle.

The tire-side device includes a sensing unit for outputting a detection signal corresponding to a tire-related condition, a signal processing unit for processing the detection signal of the sensing unit and generating data indicating the tire-related condition, and a first data communication unit for performing data communication with the general-purpose communication device and transmitting the data indicating the tire-related condition generated by the signal processing unit.

The general-purpose communication device includes a second data communication unit for performing communication with the tire-side device and receiving the data indicating the tire-related condition, a control unit for acquiring the tire-related condition based on the data indicating the tire-related condition, and a notification unit for performing notification of the tire-related condition acquired by the control unit.

DETAILED DESCRIPTION OF THE EMBODIMENT

Figure 1:
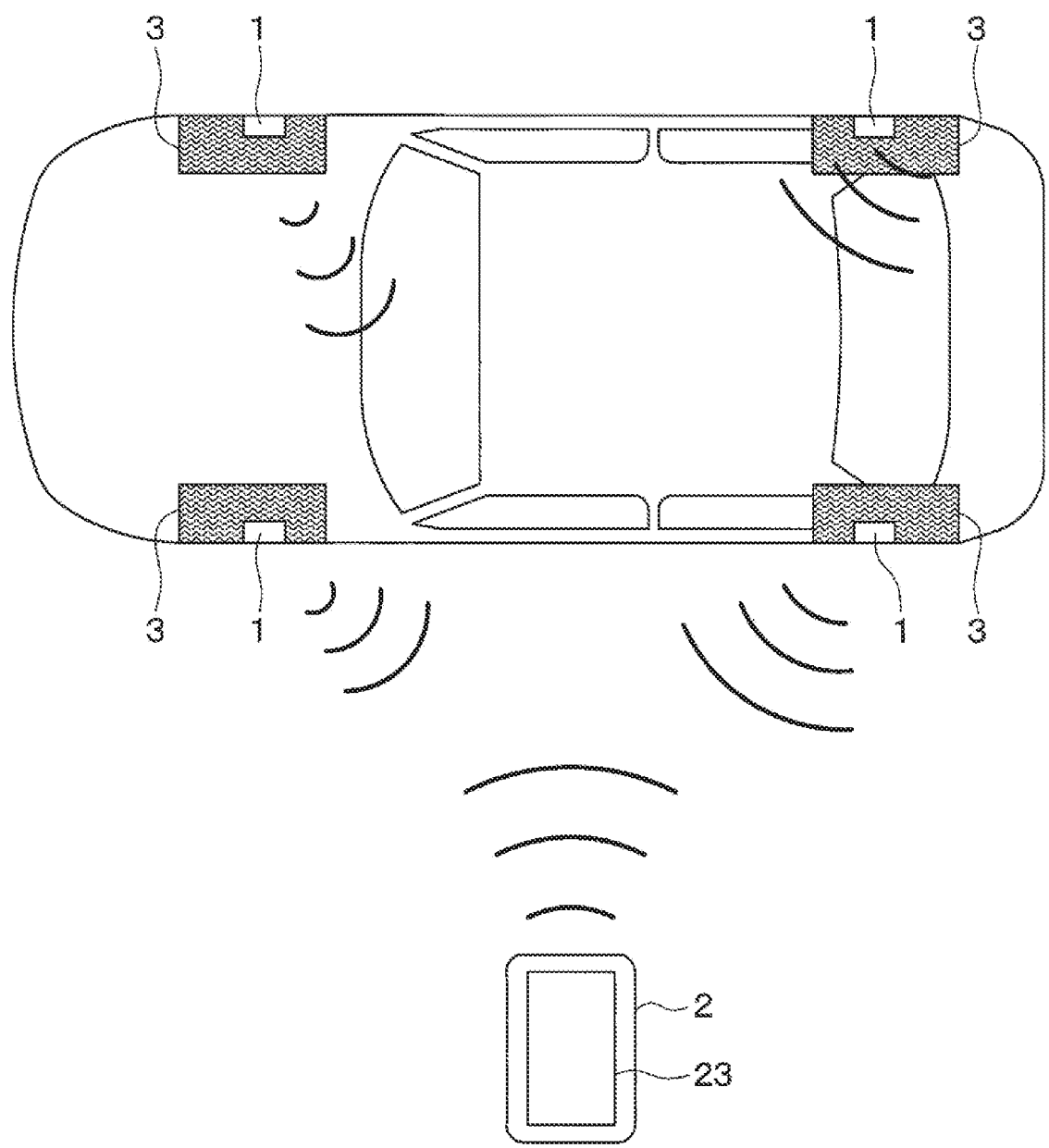
FIG. 1 is a schematic view showing an overall configuration of a tire system according to a first embodiment.

Embodiments of the present disclosure will be described below with reference to the accompanying drawings. In each embodiment described below, same or equivalent parts are designated with the same reference numerals for simplification of description.

First Embodiment

A tire system having a road surface condition determination function according to the present embodiment will be described with reference to FIG. 1 to FIG. 6. The tire system according to the present embodiment is configured to detect various conditions related to a tire based on vibration applied to a ground contact surface of the tire provided on each road wheel of the vehicle. Here, the tire system is configured to detect a road surface condition and a tire air pressure on a traveling road surface as various tire-related conditions. In addition, the tire system is configured to notify a user of the tire-related conditions by notifying detection results of the various conditions.

Figure 2:
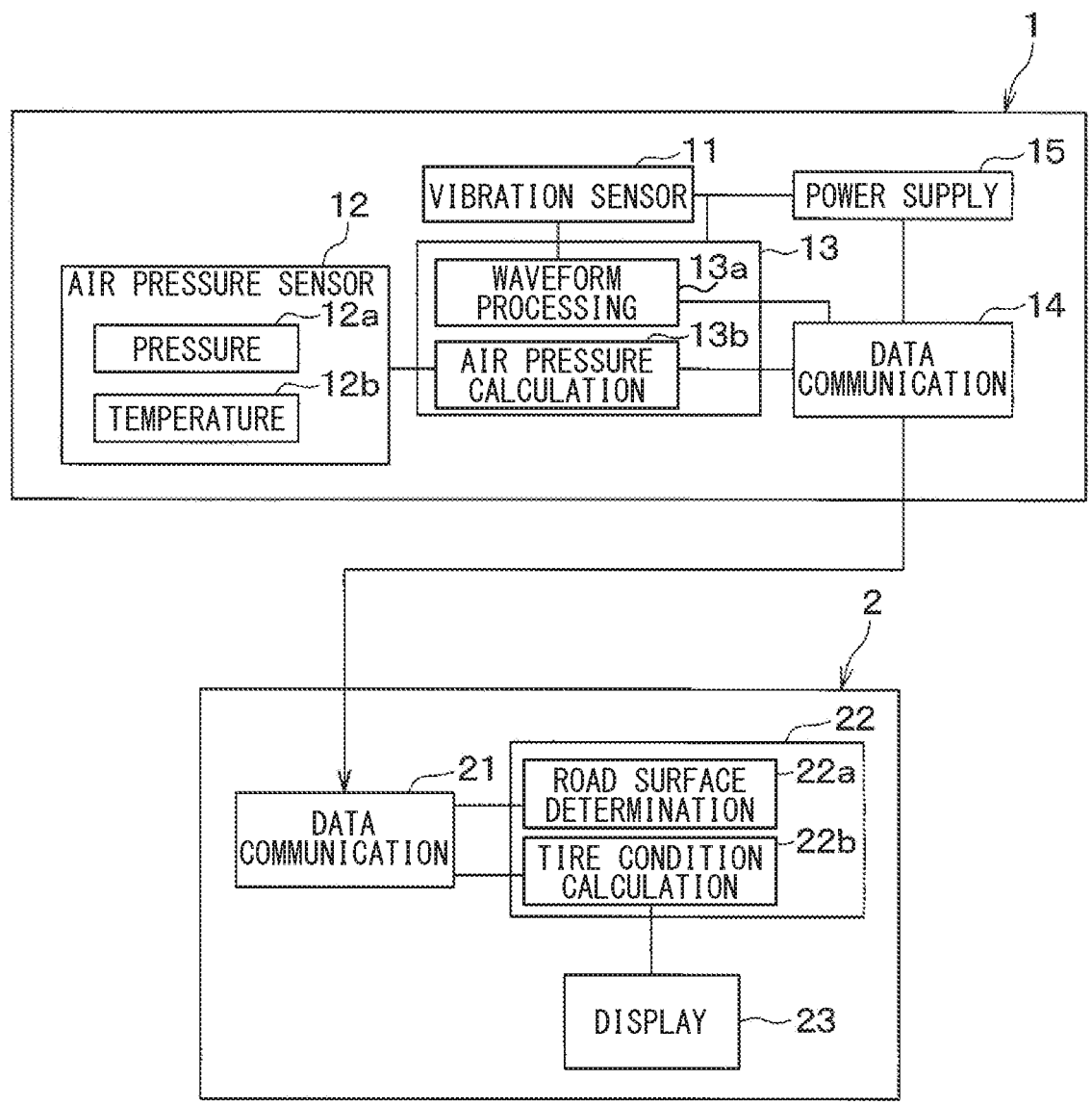
FIG. 2 is a block diagram showing a detailed configuration of a tire-side device and a general-purpose communication device.

As shown in FIG. 1 and FIG. 2, the tire system is configured to include a tire-side device 1 provided on a wheel side and a general-purpose communication device 2 provided separately from the wheel side, for example, owned by a user of the vehicle. Hereinafter, details of each unit forming the tire-side device 1 and the general-purpose communication device 2 will be described.

Figure 3:
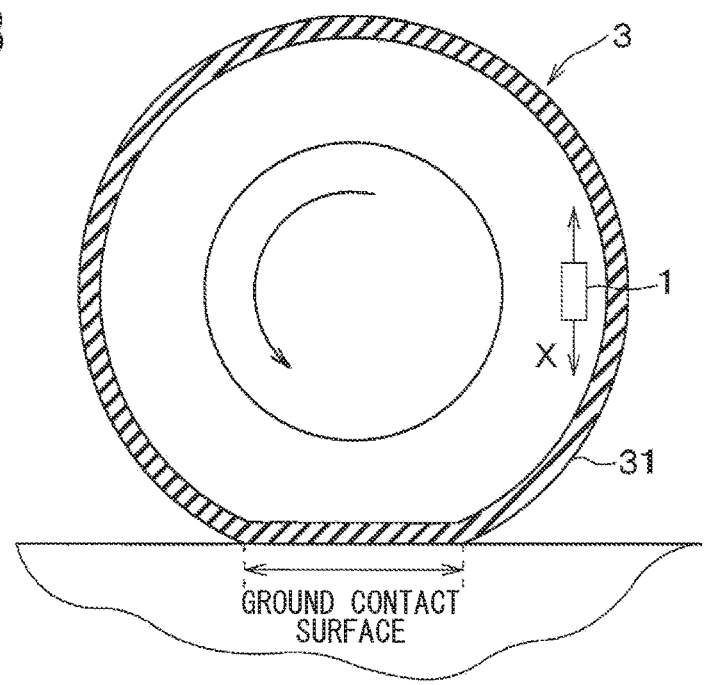
FIG. 3 is a schematic view showing in cross unit a tire to which the tire-side device is attached.

As shown in FIG. 2, the tire-side device 1 is configured to include a vibration sensor unit 11, an air pressure sensor unit 12, a signal processing unit 13, a data communication unit 14, and a power supply unit 15. The tire-side device 1 is provided, for example, on a back side of a tread 31 of a tire 3 as shown in FIG. 3.

The vibration sensor unit 11 forms a sensing unit, and forms a vibration detection unit for detecting a vibration applied to the tire 3. For example, the vibration sensor unit 11 is configured by an acceleration sensor. In case that the vibration sensor unit 11 is the acceleration sensor, the vibration sensor unit 11 outputs a detection signal of acceleration as a detection signal, which corresponds to the vibration in a direction tangential to a circular trajectory drawn up by the tire-side device 1 at the time of rotation of the tire 3, that is, a tire tangential direction indicated by an arrow X in FIG. 3. More specifically, the vibration sensor unit 11 generates as the detection signal an output voltage, which is positive in one direction and negative in the opposite direction, between two directions indicated with the arrow X. For example, the vibration sensor unit 11 performs acceleration detection at a predetermined sampling cycle set at a cycle shorter than one rotation of the tire 3, and outputs a detection result as the detection signal to the signal processing unit 13. Although the detection signal of the vibration sensor unit 11 may be represented as an output voltage or an output current, the detection signal is exemplified to be the output voltage in the present embodiment as an example.

The air pressure sensor unit 12 forms a sensing unit together with the vibration sensor unit 11, and has a configuration including a pressure sensor 12a and a temperature sensor 12b. The pressure sensor 12a outputs a detection signal indicating a tire air pressure. The temperature sensor 12b outputs a detection signal indicating a tire internal temperature. Data of the tire air pressure and the tire temperature indicated by the detection signals of the pressure sensor 12a and the temperature sensor 12b are used as data related to the tire air pressure. In the present embodiment, the data of the tire air pressure and the tire internal temperature indicated by the detection signals of the pressure sensor 12a and the temperature sensor 12b are input to the signal processing unit 13. The signal processing unit 13 calculates the tire air pressure at a reference temperature. That is, since the tire air pressure indicated by the detection signal of the pressure sensor 12a corresponds to an actually measured value of the tire air pressure, the tire air pressure actually measured at a temperature other than the reference temperature is converted to the tire air pressure of the reference temperature by correcting the actually measured value of the tire air pressure based on the internal temperature in the tire 3 indicated by the detection signal of the temperature sensor 12b.

The signal processing unit 13 is configured by a well-known microcomputer including a CPU, a ROM, a RAM, an I/O and the like, and performs various processing according to a program stored in the ROM or the like. For example, the signal processing unit 13 is configured to generate road surface data indicating a road surface condition of the traveling road surface by using and processing the detection signal of the vibration sensor unit 11 as the detection signal representing vibration data in the tangential direction of the tire and processing the detection signal, and transmit the road surface data to the data communication unit 14. The signal processing unit 13 is further configured to acquire data related to the tire air pressure based on the data transmitted from the air pressure sensor unit 12 and transmit the acquired data to the data communication unit 14.

Specifically, the signal processing unit 13 has a configuration including a waveform processing unit 13a and an air pressure calculation unit 13b. The waveform processing unit 13a is configured to extract a characteristic value of the tire vibration by using the detection signal output from the vibration sensor unit 11 as the detection signal representing the vibration data in the tangential direction of the tire and performing waveform processing of the vibration waveform indicated by the detection signal. In the present embodiment, the waveform processing unit 13a extracts the characteristic value of acceleration of the tire 3 (referred to as tire G) by performing the signal processing on the detection signal of the acceleration of the tire 3. Further, the signal processing unit 13 is configured to transmit data including the extracted characteristic value to the data communication unit 14 as road surface data. Details of the characteristic value will be described later.

The air pressure calculation unit 13 is further configured to calculate the tire air pressure at the reference temperature based on the detection signal indicating the tire air pressure transmitted from the air pressure sensor unit 12 and the detection signal indicating the tire inner temperature and transmit the calculated tire air pressure to the data communication unit 14 as the data related to the tire air pressure. The air pressure calculation unit 13b is configured to generate data related to the tire air pressure based on the detection signal of the air pressure sensor unit 12 for each predetermined periodic transmission cycle. In addition, as described later, the air pressure calculation unit 13b is further configured to generate data related to the tire air pressure in response to a request signal for the tire air pressure received from the general-purpose communication device 2.

Here, the tire air pressure under the reference temperature is converted by the air pressure calculation unit 13b. However, the data of the tire air pressure and the tire internal temperature indicated by the detection signal of the pressure sensor unit 12 may be transmitted to the data communication unit 14 as data related to the tire air pressure without conversion.

The signal processing unit 13 controls data transmission from the data communication unit 14 so that data such as the road surface data and the tire air pressure data to the data communication unit 14 at a timing at which the data transmission is to be performed. Thereby data communication is performed from the communication unit 14.

For example, the signal processing unit 13 extracts the characteristic value of the tire G each time the tire 3 makes one or more rotations, and transmits the road surface data to the communication unit 14 at a rate of one or more times every time the tire 3 makes one or more rotations. For example, the signal processing unit 13 transmits, to the data communication unit 14, the road surface data including the characteristic value of the tire G extracted during one rotation of the tire 3 when transmitting the road surface data to the data communication unit 14. Further, the air pressure calculation unit 13b transmits data on the tire air pressure to the data communication unit 14 at every predetermined periodic transmission cycle.

It is noted that the signal processing unit 13 is configured to be switched to a sleep state when the vehicle is stopped, and switched to a wake-up state when the vehicle starts traveling or when a user's request is received through the general-purpose communication device 2. Specifically, the signal processing unit 13 is switched to the wake-up state when the voltage input as the detection signal of the vibration sensor unit 11 exceeds a predetermined threshold value. The signal processing unit 13 is switched to the sleep state when it is confirmed that the vehicle is stopped based on the detection signal of the vibration sensor unit 11. Thereby, battery life is improved.

The data communication unit 14 operates as a part corresponding to a first data communication unit that performs data communication with the general-purpose communication device 2. The data communication unit 14 only needs to be able to transmit at least the data indicating the tire-related condition, such as the road surface data and the data related to tire air pressure, to the general-purpose communication device 2. However, the data communication unit 14 is configured to be able to perform bidirectional communication. Thereby, the request signal from the general-purpose communication device 2 can be received through the data communication unit 14.

Various forms of bidirectional communication can be applied, such as Bluetooth communication including BLE (Bluetooth Low Energy) communication, wireless LAN (Local Area Network) such as WIFI, Sub-GHz communication, ultra wideband communication, ZigBee, etc. can be applied. "Bluetooth" is a registered trademark.

For example, when the road surface data and the data related to the tire air pressure are transmitted from the waveform processing unit 13*a* and the air pressure calculation unit 13*b*, the data communication unit 14 performs data transmission at that timing. The timing of data transmission from the data communication unit 14 is controlled by the signal processing unit 13. For example, in case of the road surface data, the data communication unit 14 performs the data transmission each time the data is sent from the signal processing unit 13 every one rotation or a plurality of rotations of the tire 3. Further, in case of the data related to the tire air pressure, the data communication unit 14 performs the data transmission each time the data is transmitted from the air pressure calculation unit 13*b* at every predetermined periodic transmission cycle.

The power supply unit 15 is provided as a power supply for the tire-side device 1, and supplies electric power to each unit included in the tire-side device 1 so that each unit can be operated. The power supply unit 15 is configured by a battery such as a button battery, for example. Since the tire-side device 1 is provided within the tire 3, the battery cannot be easily replaced. It is therefore necessary to reduce power consumption. In addition to the battery, the power supply unit 15 may be configured by a power generator, a storage battery, and the like. In case the power supply unit 15 has a configuration including the power generator, the problem of battery life is reduced as compared with the case where the power supply unit is the battery. It is however difficult to generate a large power. Therefore it is necessary to reduce power consumption.

On the other hand, the general-purpose communication device 2 is used as a device different from the vehicle. The general-purpose communication device 2 receives the road surface data and the data related to the tire air pressure from the tire-side device 1 and notifies these data as information related to tires in addition to the detection of the road surface condition and the tire air pressure.

Specifically, the general-purpose communication device 2 has a configuration including a data communication unit 21, a control unit 22 and a display unit 23.

The data communication unit 21 operates as a part of a second data communication unit, and performs a function of receiving various data transmitted from the data communication unit 14 of the tire-side device 1 and transmitting the data to the control unit 22. The data communication unit 21 also performs a function of transmitting a request signal for the tire air pressure from the control unit 22 to each tire-side device 1.

The control unit 22 is configured by a well-known microcomputer including a CPU, a ROM, a RAM, an I/O and the like, and performs various processing according to a program stored in the ROM or the like. Specifically, the control unit 22 has a configuration including a road surface determination unit 22*a* and a tire condition calculation unit 22*b*.

The road surface determination unit 22*a* determines the road surface condition based on the received road surface data. Specifically, the road surface determination unit 22*a* stores a support vector for each type of road surface. The road surface determination unit 22*a* determines the road surface condition by comparing the characteristic value included in the road surface data transmitted from the tire-side device 1 with the support vector.

The support vector is a characteristic value serving as a model, and is acquired, for example, by learning using a support vector machine. The support vector is acquired by experimentally driving a vehicle equipped with the tire-side device 1 on each type of road surface. During the experimental driving, the characteristic value extracted from the detection signal of the vibration sensor unit 11 is learned for a predetermined number of tire rotations, and a predetermined number of typical characteristic values extracted from the learned data is used as the support vector. For example, the characteristic value is learned for one million rotations for each type of road surface, and a typical characteristic value in 100 rotations is extracted from the learned values as the support vector. A similarity between the support vector and the characteristic value included in the road surface data is determined, and the type of the road to which the support vector having the high similarity belongs is defined as the road surface condition on the traveling road surface of the vehicle.

In determining the road surface condition, the road surface determination unit 22*a* transmits the determined road surface condition to the display unit 23, and transmits the road surface condition to a driver from the display unit 23 when necessary. Thus, the driver is enabled to try to drive the vehicle in a manner matching the road surface condition and avoid danger to the vehicle. For example, the determined road surface condition may be displayed always by the display unit 23 or the road surface condition may be displayed to warn the driver only when the vehicle need be driven more carefully than usual, for example, when the determined road surface condition corresponds to a wet road or a frozen road.

The tire condition calculation unit 22*b* calculates the tire air pressure based on the data on the tire air pressure sent from the air pressure calculation unit 13*b*, and checks whether the tire air pressure has decreased. For example, the tire condition calculation unit 22*b* stores a threshold value as a criterion for determining a tire air pressure decrease indicating a decrease in tire air pressure, and compares the calculated tire air pressure with the threshold value to determine the tire air pressure decrease.

Specifically, when the air pressure calculation unit 13*b* receives data of the tire air pressure, which is converted to the data at the reference temperature, from the air pressure calculation unit 13*b*, the tire condition calculation unit 22*b* transmits the tire air pressure to the display unit 23. Alternatively, when the tire air pressure at the reference temperature transmitted from the air pressure calculation unit 13*b* is equal to or lower than the threshold value, the tire condition calculation unit 22*b* notifies the display unit 23 that the tire air pressure is decreasing. Further, when the data of the tire air pressure and the temperature inside the tire detected by the air pressure sensor unit 12 are sent from the tire-side device 1, the tire condition calculation unit 22*b* converts the data of the tire air pressure to the tire air pressure under the reference temperature based on the received data of the tire air pressure and the temperature. Then, the tire condition calculation unit 22*b* notifies the display unit 23 that the converted tire air pressure itself at the reference temperature or that the tire air pressure has decreased to be lower than the threshold value.

The control unit 22 may also transmit the request signal for the tire air pressure to each tire-side device 1 based on a request from the user. For example, the user may want to check the tire air pressure before traveling of the vehicle. If data on the tire air pressure does not arrive until the timing of the periodic transmission cycle, it takes time to confirm the tire air pressure. Assuming such a case, if there is a request from the user, the request signal for the tire air pressure is transmitted from the control unit 22 through the data communication unit 21.

The display unit 23 is provided as an input unit and a notification unit, configured by, for example, a touch panel type liquid crystal display, and used to input a tire air pressure detection request or to notify a driver of the road surface condition or the tire air pressure. Further, the display unit 23 is configured to enable inputting the various information, the road surface condition, the request for tire air pressure and the like. The display unit 23 is configured to notify the user of the determination result of the road surface condition and the detection result of the tire air pressure by displaying these results when these results are transmitted from the control unit 22. Further, it is also possible to instruct the control unit 22 to detect the tire air pressure through the display unit 23. Thus, the request signal for the tire air pressure is output from the control unit 22.

The display unit 23 can display the road surface condition and the tire air pressure. Therefore, it is preferable to arrange the general-purpose communication device 2 in a place where the display unit 23 can be easily recognized visually during driving so as not to hinder the driving operation of the driver.

Although the input unit and the notification unit are both configured by the display unit 23, other configurations may be used. For example, an input switch (not shown) may be provided in the general-purpose communication device 2 so that the input switch may be used as an input unit to make the request for tire air pressure detection. In addition, the notification unit may be configured with a buzzer, a voice guidance device or the like, so that a buzzer sound or voice guidance may be used to aurally notify the driver of the road surface condition or the tire air pressure.

The tire system is configured as described above. Next, details of the characteristic value extracted by the waveform processing unit 13a will be described below.

The characteristic value referred to herein is a quantity indicative of a value indicating a feature of vibration applied to the tire 3 and acquired by the vibration sensor unit 11. The characteristic value is represented by a feature vector, for example.

Figure 4:
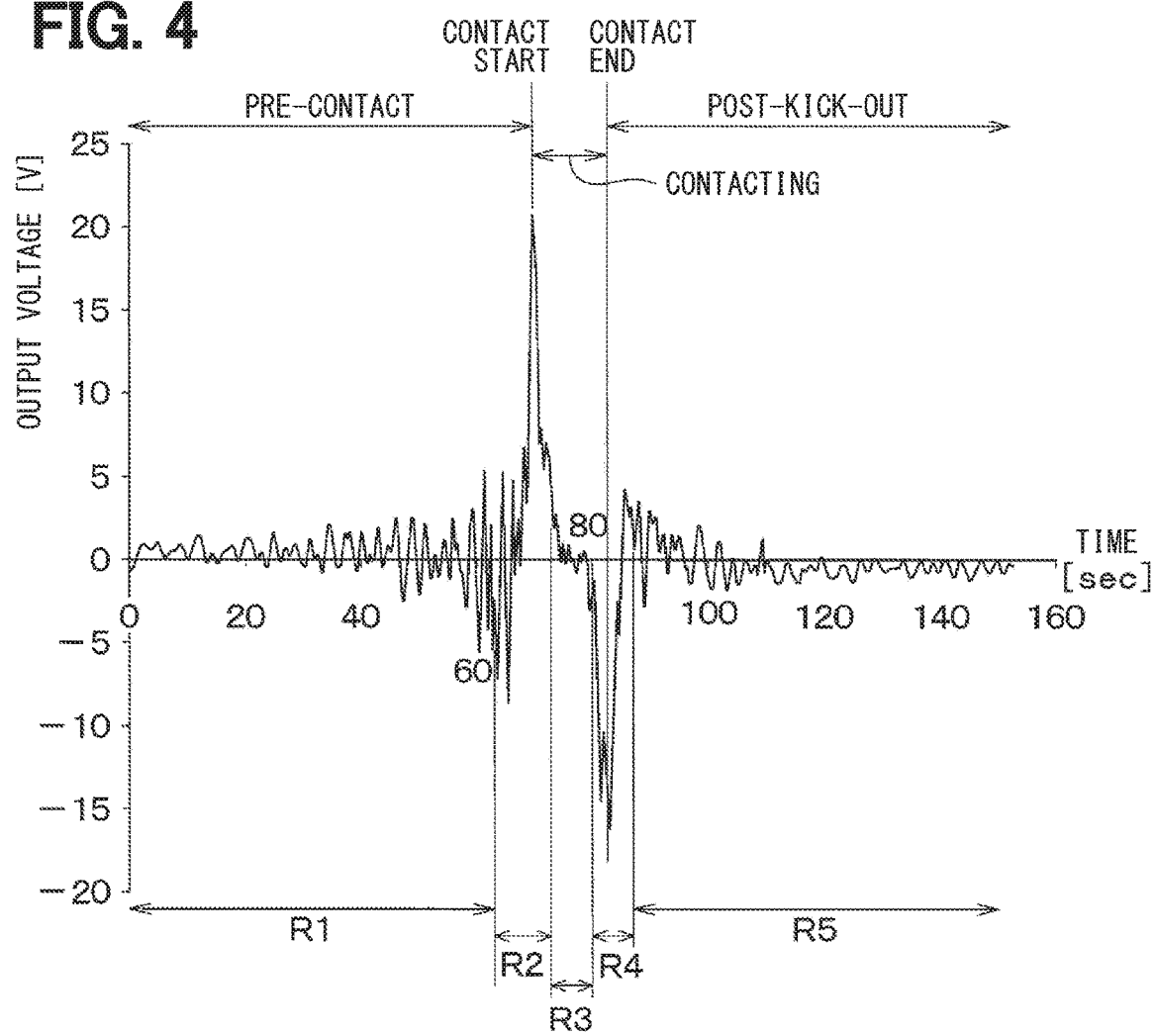
FIG. 4 is an output voltage waveform chart of a vibration sensor unit during rotation of the tire.

For example, the output voltage waveform of the detection signal of the vibration sensor unit 11 output during tire rotation changes as shown in FIG. 4. As shown in this figure, the output voltage of the vibration sensor unit 11 has a local maximum value at a contact start time when a portion of the tread 31 of the tire 3 corresponding to the position of the vibration sensor unit 11 starts to contact the ground during the rotation of the tire 3. Hereinafter, a peak value at the start time of contacting the ground where the output voltage of the vibration sensor unit 11 has the local maximum value is referred to as a first peak value. Further, as shown in FIG. 4, the output voltage of the vibration sensor unit 11 has a local minimum value at the contact end time when the portion of the tread 31 of the tire 3 corresponding to the position of the vibration sensor unit 11 is changed from a state contacting the ground to a state not contacting the ground during the rotation of the tire 3. Hereinafter, a peak value at the end time of contacting the ground where the output voltage of the vibration sensor unit 11 has the local minimum value is referred to as a second peak value.

The output voltage of the vibration sensor unit 11 takes the peak values at the above-described timings for the following reasons. When the portion of the tread 31 corresponding to the position of the vibration sensor unit 11 contacts the ground with the rotation of the tire 3, a portion of the tire 3, which had a substantially cylindrical surface, is pressed to be deformed into a flat shape in the vicinity of the vibration sensor unit 11. With reception of an impact at this time, the output voltage of the vibration sensor unit 11 takes the first peak value. When the portion of the tread 31 corresponding to the position of the vibration sensor unit 11 is separated from the ground with the rotation of the tire 3, the pressing of the portion of the tire 3 is released in the vicinity of the vibration sensor unit 11, and the flat shape of the portion of the tire 3 returns to the substantially cylindrical shape. With a reception of an impact at the time of restoring the original shape of the tire 3, the output voltage of the vibration sensor unit 11 takes the second peak value. As described above, the output voltage of the vibration sensor unit 11 takes the first peak value and the second peak value at the ground contact start time and the ground contact end time, respectively. Since a direction of the impact at the time when the tire 3 is pressed and a direction of the impact at the time when the tire 3 is released from pressurization are opposite, polarities of the output voltage of the vibration sensor unit 11 are also opposite.

Here, the moment at which the portion of the tire tread 31 corresponding to the position of the vibration sensor unit 11 touches the road surface is referred to as a step-in region, and the moment at which the tire tread 31 leaves the road surface is referred to as a kick-out region. The step-in region includes the timing of the first peak value, and the kick-out region includes the timing of the second peak value. In addition, a region before the step-in region is referred to as a pre-step-in region, and the region from the step-in region to the kick-out region, that is, the region of the tire tread 31 corresponding to the position where the vibration sensor unit 11 is attached is referred to as a pre-kick-out region. The region after the kick-out region is referred to as a post-kick-out region. In this manner, the period in which the portion of the tire tread 31 corresponding to the position of the vibration sensor unit 11 is in contact with the ground and before and after that portion can be divided into five regions. In FIG. 4, the pre-step-in region, the step-in region, the pre-kick-out region, the kick-out region and the post-kick-out region of the detection signal are indicated as five regions R1 to R5 in sequence, respectively.

The vibration generated in the tire 3 varies in each of the divided regions in correspondence to the road surface condition, and the detection signal of the vibration sensor unit 11 changes. Therefore, by analyzing a frequency of the detection signal of the vibration sensor unit 11 in each region, the road surface condition of the vehicle on the road surface is detected. For example, in a slippery road surface such as a snow-covered road, the shearing force at the time of kicking out decreases, so that a frequency band value selected from 1 kHz to 4 kHz band in the kick-out region R4 and the post-kick-out region R5 decreases. Since each frequency component of the detection signal of the vibration sensor unit 11 changes in correspondence to the road surface condition, it is possible to determine the road surface condition based on the frequency analysis of the detection signal.

Figure 5:
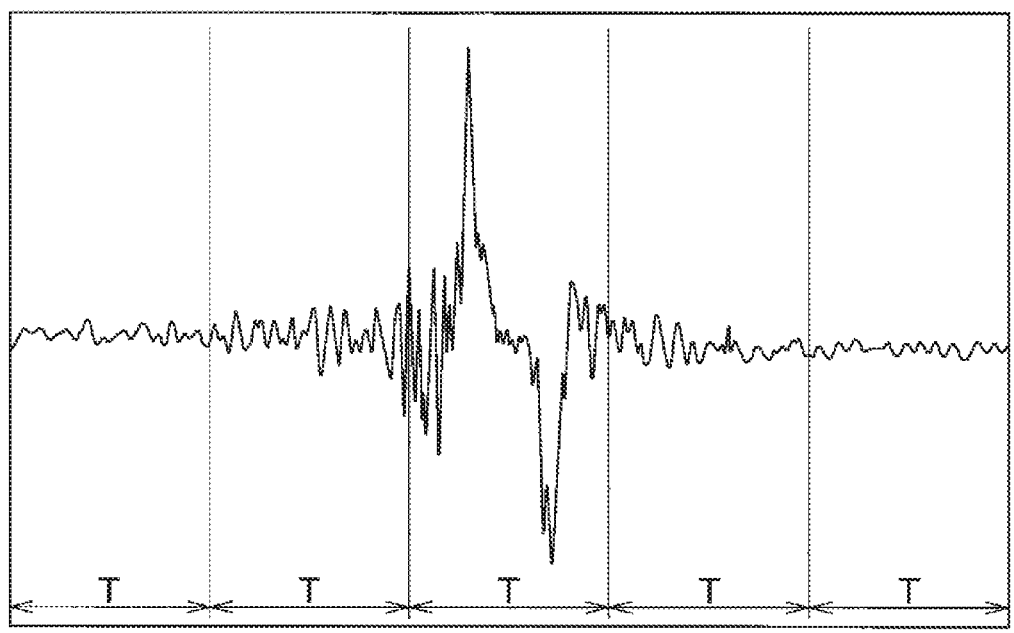
FIG. 5 is a chart showing a detection signal of the vibration sensor unit in a manner divided into plural segments each of which is a time window of a predetermined time width T.

The waveform processing unit 13*a* divides the detection signal of the vibration sensor unit 11 for one rotation of the tire 3 having a continuous time axis waveform into a plurality of sections each having a predetermined time width T as shown in FIG. 5, performs the frequency analysis in each segment, and extracts the characteristic value. Specifically, by performing the frequency analysis in each segment, the waveform processing unit 13*a* calculates a power spectrum value in each frequency band, that is, a vibration level in a specific frequency band, as the characteristic value.

The number of sections divided by the time window of the time width T is a value that varies with the vehicle speed, more specifically, with the rotation speed of the tire 3. In the following description, the number of sections for one rotation of the tire 3 is assumed to be "n" (where "n" is a natural number).

For example, the characteristic value is calculated as the power spectrum value, which is acquired by passing the detection signal of each segment through a plurality of filters of a specific frequency band, for example, five band-pass filters of 0 to 1 kHz, 1 to 2 kHz, 2 to 3 kHz, 3 to 4 kHz and 4 to 5 kHz. This characteristic value is a characteristic vector xi of a section "i" (natural number 1≤i≤n) which is expressed as a matrix of elements defined by the following equation 1. In this matrix, each element is represented as the power spectrum value $a_{ik}$ in each specified frequency band.

$$x_i = \begin{bmatrix} a_{i1} \\ a_{i2} \\ a_{i3} \\ a_{i4} \\ a_{i5} \end{bmatrix}$$ [Equation 1]

"k" of the power spectrum value $a_{ik}$ is the number of the specific frequency bands, that is, the number of the band-pass filters. In case that the frequency band of 0 to 5 kHz is divided into five units as exemplified above, "k" is 1 to 5 (k=1 to 5). The determinant X that comprehensively represents the characteristic vectors X1 to Xn of all the sections 1 to n is as follows.

$$x = \begin{pmatrix} a_{11} & a_{21} & \ldots & a_{n1} \\ a_{12} & a_{22} & \ldots & a_{n2} \\ a_{13} & a_{23} & \ldots & a_{n3} \\ a_{14} & a_{24} & \ldots & a_{n4} \\ a_{15} & a_{25} & \ldots & a_{n5} \end{pmatrix}$$ [Equation 2]

This determinant x is an equation representing the characteristic value of one rotation of the tire. The waveform processing unit 13*a* extracts the characteristic value represented by the above determinant X by frequency analysis of the detection signal of the vibration sensor unit 11.

Subsequently, details of the determination of the road surface condition based on the characteristic value of the tire G will be described.

The determination of the road surface condition is performed by comparing the characteristic value included in the received road surface data with the support vector for each type of road surfaces stored in the road surface determination unit 22*a*. For example, the similarity between the feature amount and all the support vectors for each type of road surface is acquired, and the road surface of the support vector having the highest similarity is determined as the current traveling road surface.

For example, the calculation of the degrees of similarity of the characteristic value to all the support vectors stored for each type of the road surfaces can be performed by a method as described below.

As described above, for the determinant x representing the characteristic value, the determinant of the characteristic value is expressed as X(r), the determinant of the support vector is expressed as X(s), and the power spectrum value aik as each element of the determinants is expressed by a(r)ik and a(s)ik. In this case, the determinant X(r) of the characteristic value and the determinant X(s) of the support vector are respectively expressed as follows.

$$x(r) = \begin{pmatrix} a(r)_{11} & a(r)_{21} & \ldots & a(r)_{n1} \\ a(r)_{12} & a(r)_{22} & \ldots & a(r)_{n2} \\ a(r)_{13} & a(r)_{23} & \ldots & a(r)_{n3} \\ a(r)_{14} & a(r)_{24} & \ldots & a(r)_{n4} \\ a(r)_{15} & a(r)_{25} & \ldots & a(r)_{n5} \end{pmatrix}$$ [Equation 3]

$$x(s) = \begin{pmatrix} a(s)_{11} & a(s)_{21} & \ldots & a(s)_{n1} \\ a(s)_{12} & a(s)_{22} & \ldots & a(s)_{n2} \\ a(s)_{13} & a(s)_{23} & \ldots & a(s)_{n3} \\ a(s)_{14} & a(s)_{24} & \ldots & a(s)_{n4} \\ a(s)_{15} & a(s)_{25} & \ldots & a(s)_{n5} \end{pmatrix}$$ [Equation 4]

The similarity indicates the degree of similarity between the characteristic value indicated by the two determinants and the support vector, and means that the higher the degree of similarity, the more similar. In case of the present embodiment, the road surface determination unit 22*a* calculates the similarity using the kernel method, and determines the road surface condition based on the similarity. Here, the inner product of the determinant X(r) of the characteristic value and the determinant X(s) of the support vector, that is, a distance between coordinates indicated by the characteristic vectors Xi of the sections divided for each time window of the predetermined time width T in a characteristic space, is calculated and used as the degree of similarity.

Figure 6:
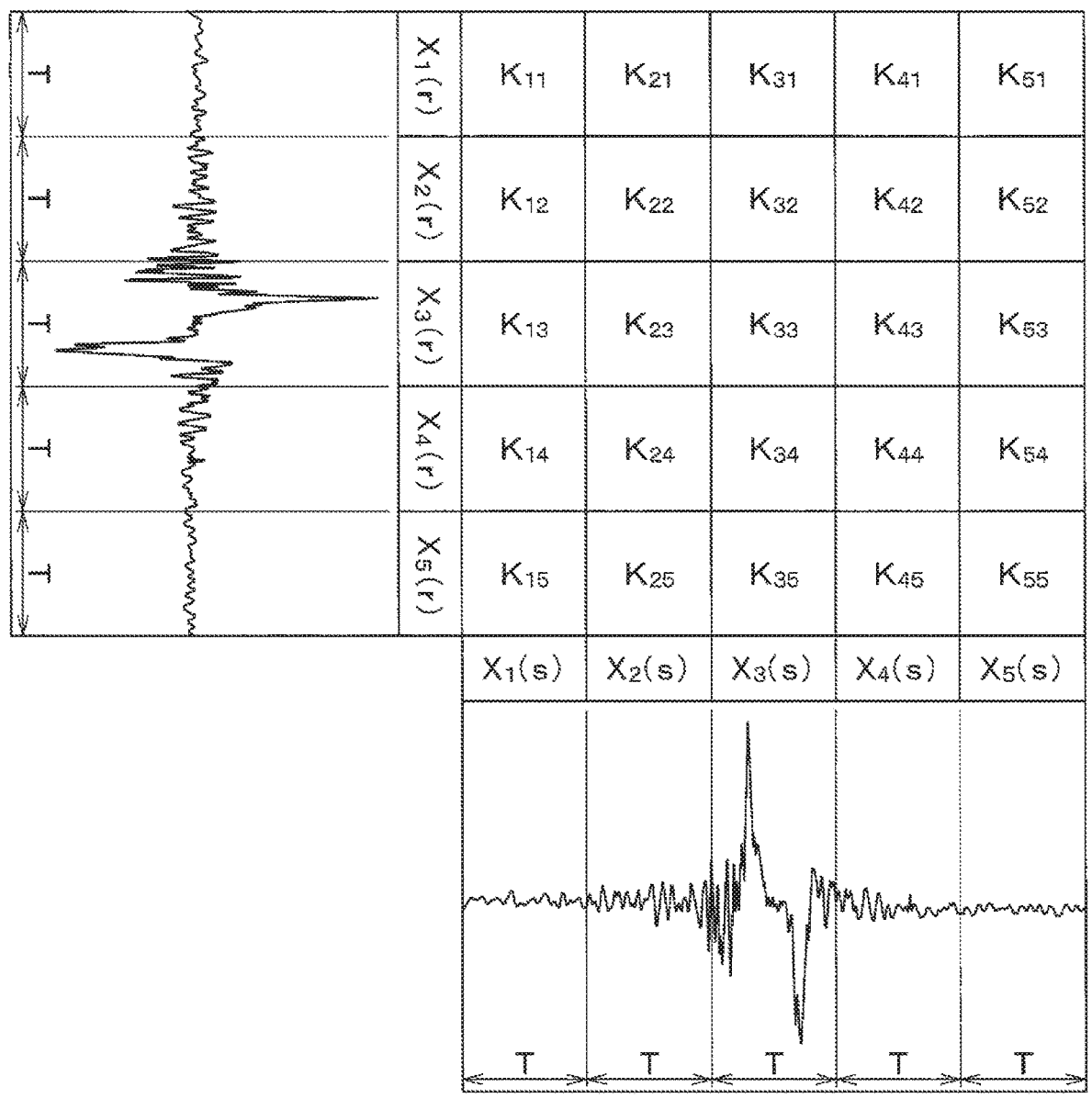
FIG. 6 is a graph showing respective relationships between determinants Xi(r) and Xi(s) and a distance Kyz in each of the segments determined by dividing, by each of the time windows having the predetermined time width T, a time axis waveform during a present-time tire rotation and a time axis waveform during an immediately previous tire rotation.

For example, as shown in FIG. 6, regarding the time axis waveform of the detection signal of the vibration sensor unit 11, each of the time axis waveform at the time of present rotation of the tire 3 and the time axis waveform of the support vector is divided into each segment by the time window of the predetermined time width T. In the illustrated example, since each time axis waveform is divided into five sections, "n" is 5, and "i" is represented as 1≤i≤5. Here, as shown in the figure, the characteristic vector Xi of each segment at the time of present rotation of the tire 3 is Xi(r), and the characteristic vector of each segment of the support vector is Xi(s). In this case, regarding the distance Kyz between the coordinates indicated by the characteristic vector Xi of each segment, it is shown like a cell where a horizontal cell including the characteristic vector Xi(r) of each segment at the time of present rotation of the tire 3 and a vertical cell containing the characteristic vector Xi(s) of the support vector intersect. As for the distance Kyz, "y" is obtained by rewriting "i" in Xi (s), and "z" is obtained by rewriting "i" in Xi(r). It should be noted that the numbers of sections between the support vector and the present rotation of the tire 3 may become different depending on the vehicle speed. It is however assumed here that the numbers of sections are equal.

In case of the present embodiment, the characteristic vectors are acquired by dividing into five specific frequency bands. Therefore, the characteristic vector Xi of each segment is represented in the six-dimensional space combined with the time axis, and the distance between the coordinates indicated by the characteristic vectors Xi of the segments is the distance between the coordinates in the six-dimensional space. However, the distance between the coordinates indicated by the characteristic vector of each segment is smaller and larger as the characteristic value and the support vector are more similar and less similar, respectively. Therefore, the similarity becomes higher as the distance becomes smaller, and the similarity becomes lower as the distance becomes larger.

For example, in case the segments 1 to n are provided by time division, each of the distances Kyz between the coordinates represented by the characteristic vectors of the individual segments 1 is expressed by the following equation.

$$Kyz = \sqrt{\{a(r)_{11} - a(s)_{11}\}^2 + \{a(r)_{12} - a(s)_{12}\}^2 + \ldots \{a(r)_{15} - a(s)_{15}\}^2}$$ [Equation 5]

In this way, the distance Kyz between the coordinates indicated by the characteristic vectors of the units by time division is acquired for all the segments, a total sum Ktotal of the distances Kyz of all segments is calculated, and this total Ktotal is used as a value corresponding to the similarity. Then, the total Ktotal is compared with a predetermined threshold value Th. If the total Ktotal is larger than the threshold value Th, the similarity is determined to be low. If the total Ktotal is smaller than the threshold value Th, the similarity is determined to be high. Then, the similarity is calculated for all the support vectors, and it is determined that the type of the road surface corresponding to the support vector having the highest similarity is determined to be the road surface condition of the presently traveling road. Thus, the road surface condition can be determined.

Here, the total sum Ktotal of the distances Kyz between the two coordinates indicated by the characteristic vectors of the respective segments is used as the value corresponding to the similarity. However, another parameter indicating the similarity may be used. For example, as a parameter indicating the similarity, an average distance Kave, which is an average value of distances Kyz calculated by dividing the total sum Ktotal by the number of units, may be used, or the similarity may be determined by using various kernel functions as proposed conventionally. Instead of using all of the characteristic vectors, the similarity may be calculated by excluding a path having a low similarity from the characteristic vectors.

As described above, the tire system according to the present embodiment performs the determination of the road surface condition and the detection of the tire air pressure. In the tire system according to the present embodiment, the general-purpose communication device 2 is configured to perform data communication with the tire-side device 1, and the tire-side device 1 is configured to transmit the road surface data and the data related to the tire air pressure to the general-purpose communication device 2. For this reason, by determining the road surface condition and calculating the tire air pressure by the general-purpose communication device 2 and displaying the road surface condition and the tire air pressure through the display unit 23, it is possible to notify the user of the road surface condition and the tire air pressure.

In this manner, the tire system is enabled to notify the tire-related condition through the general-purpose communication device 2 based on the communication between the general-purpose communication device 2 and the tire-side device 1.

Since the information related to the tire can be notified through the general-purpose communication device 2, these functions can be provided by simply installing a program used for determining the road surface condition and detecting the tire air pressure in the general-purpose communication device 2 later after the time of sale or delivery of the vehicle even in case the vehicle is not originally equipped with such functions at the time of vehicle sale or delivery. Therefore, it is possible to provide such a function capable of notifying the tire-related condition later even when it is not provided at the time of the vehicle sale or delivery. For example, even in case the tire is not provided with the tire-side device 1 at the time of the vehicle sale or delivery, the vehicle can be changed to have the tire system, which is capable of notification of the tire-related condition, later by changing the tire to the tire 3 having the tire-side device 1.

Second Embodiment

A second embodiment will be described next. The present embodiment is different from the first embodiment in that the determination of the road surface condition and the detection of the tire air pressure can be performed for each individual identification information (hereinafter, referred to as tire ID) of the tire 3. Since other parts of the present embodiment are the same as those of the first embodiment, only the parts different from the first embodiment will be described.

Figure 7:
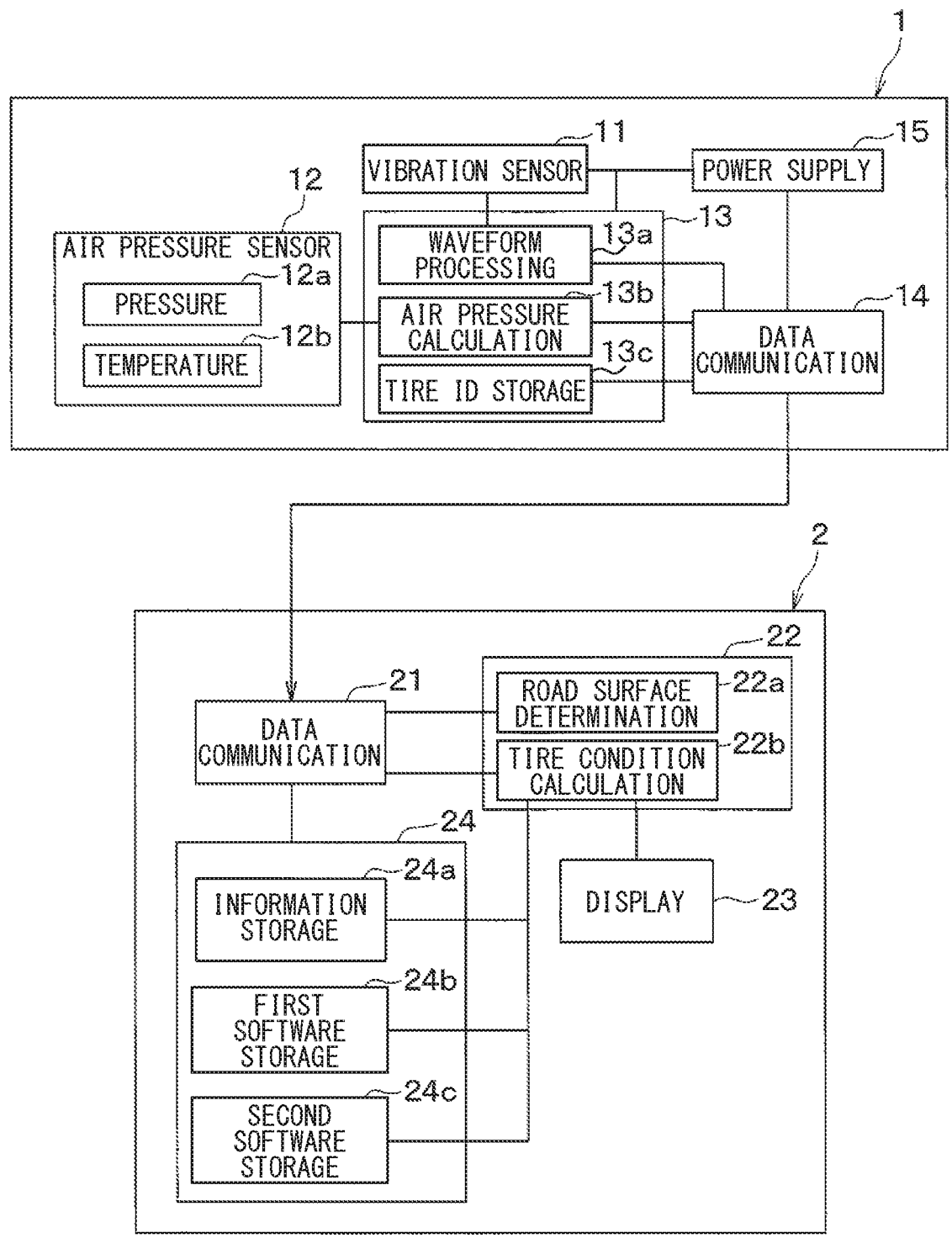
FIG. 7 is a block diagram showing a detailed configuration of a tire-side device and a general-purpose communication device of a tire system according to a second embodiment.

As shown in FIG. 7, in the tire system of the present embodiment, the signal processing unit 13 of the tire-side device 1 includes a tire ID storage unit 13c, and the general-purpose communication device 2 includes a storage unit 24.

The tire ID storage unit 13c stores information on the tire ID of each tire-side device 1. The tire ID is individual information of the tire 3. For each tire ID, various types of tire information such as the type, brand, and tire size of the tire 3 are determined. The type of the tire 3 is, for example, a radial tire, a winter tire, and an all-season tire.

The storage unit 24 stores various types of information for each type of the tire 3, and includes an information storage unit 24a, a first software storage unit 24b, and a second software storage unit 24c.

The information storage unit 24a stores various tire information and the like for each tire ID. Further, in case of the present embodiment, the information storage unit 24a stores, for each tire ID, information regarding the support vector and the threshold value for determining the tire air pressure decrease.

The first software storage unit 24b stores software for determining the road surface condition. For example, as described above, the software stored in the first software storage unit 24b is a program for determining the road surface condition by comparing the characteristic value included in the road surface data with the support vector for each type of road surface. In case of the present embodiment, the road surface determination unit 22a reads out the software stored in the first software storage unit 24b and various types of information for each tire ID stored in the information storage unit 24a, and compares the characteristic value included in the road surface data sent from the tire-side device 1 with the support vector. Thereby, determination of the road surface state is performed.

The second software storage unit 24c stores software for detecting tire air pressure. As described above, the tire condition calculation unit 22b acquires the tire air pressure from the data related to the tire air pressure. In case the data related to the tire air pressure includes the tire air pressure at the reference temperature, the second software storage unit 24c stores software for reading out such stored data. The second software storage unit 24c further stores software for detecting the tire air pressure decrease by comparison of the tire air pressure with a threshold value corresponding to the tire ID stored in the information storage unit 24a.

Further, as the data related to the air pressure, the data related to the tire air pressure and the temperature inside the tire indicated by the detection signal of the air pressure sensor unit 12 may be sent as detected without any processing in some cases. In this case, the second software storage unit 24c further stores software for converting the detected tire air pressure to the air pressure at the reference temperature based on each data. In case of the present embodiment, the tire condition calculation unit 22b reads out the software stored in the second software storage unit 24c and performs calculation of the tire air pressure based on the data related to the tire air pressure sent from the tire-side device 1 and detection of the tire air pressure decrease.

As described above, in the present embodiment, the storage unit 24 is provided in the general-purpose communication device 2. The storage unit 24 includes not only the tire information for each tire ID, the support vector and the threshold value for detecting the tire air pressure decrease, but also the software for determining the road surface condition and the software for detecting the tire air pressure.

In this way, for each tire ID, it is possible to determine the road surface condition based on the appropriate support vector or to detect the tire air pressure decrease based on the appropriate threshold value. Therefore, it is possible to provide more accurate information about the road surface condition and the tire air pressure as compared with a tire system where the same common support vector and the same tire air pressure determination threshold value are used for all tires.

It is noted that the tire ID can be recognized by the general-purpose communication device 2 by attaching the tire ID to the road surface data and the data related to tire air pressure transmitted from each tire-side device 1 to the general-purpose communication device 2. Further, instead of including the tire ID storage unit 13c in the tire-side device 1, the tire ID may be provided to be selected by the user through the display unit 23.

Third Embodiment

A third embodiment will be described next. In the present embodiment, the function of the storage unit 24 is provided outside the general-purpose communication device 2 as opposed to the second embodiment. Other configuration is the same as the second embodiment, and hence only configuration different from the second embodiment will be described.

Figure 8:
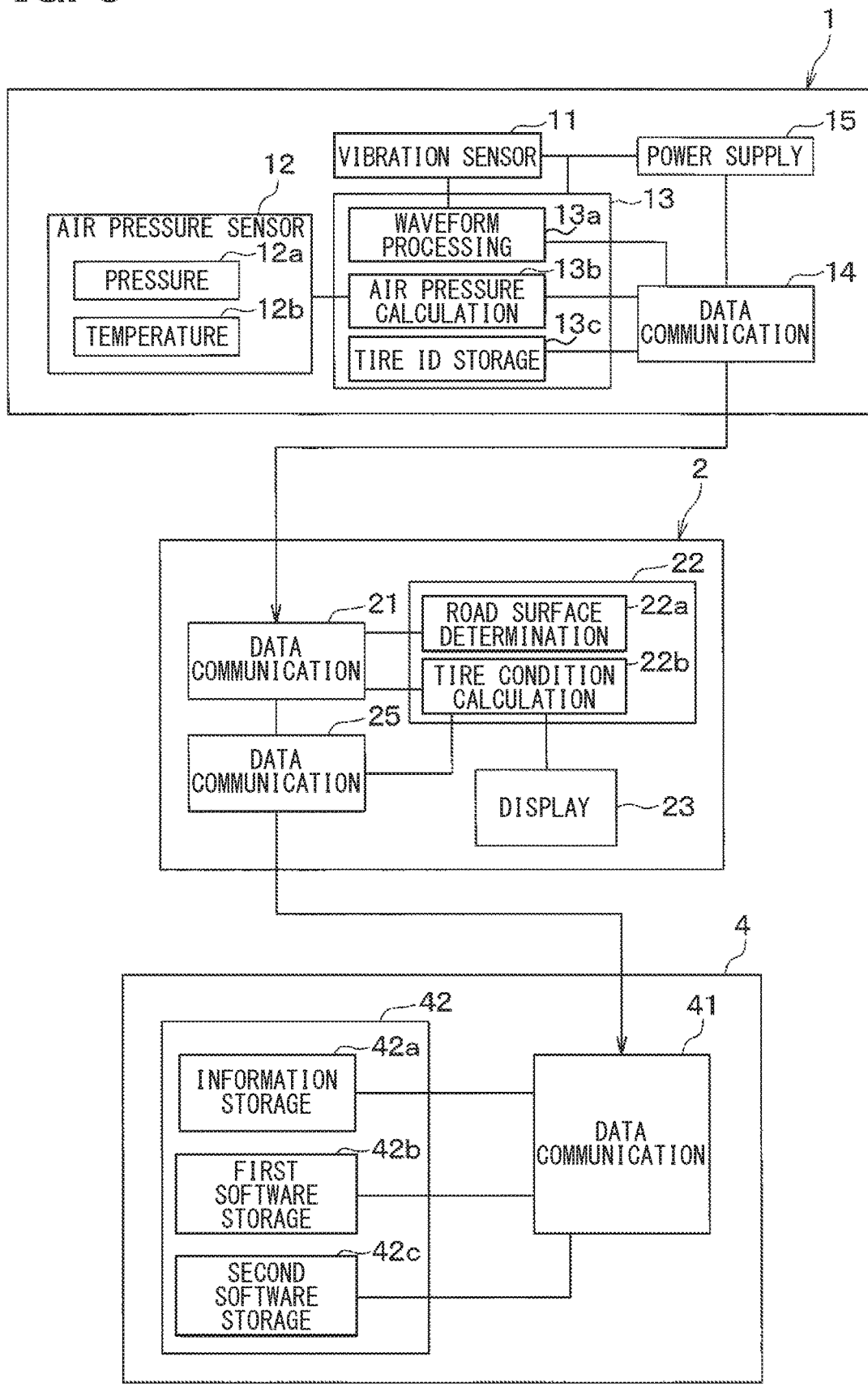
FIG. 8 is a block diagram showing a detailed configuration of a tire-side device and a general-purpose communication device of a tire system according to a third embodiment.

As shown in FIG. 8, the tire system according to the present embodiment includes a data server 4 in addition to the tire-side device 1 and the general-purpose communication device 2.

The general-purpose communication device 2 includes a data communication unit 25 as a third data communication unit in addition to the data communication unit 21, thereby to enable data communication with the data server 4.

The data server 4 includes a data communication unit 41 and a storage unit 42.

The data communication unit 41 is provided as a fourth data communication unit thereby to perform data communication with the general-purpose communication device 2. The data communication unit 25 of the general-purpose communication device 2 and the data communication unit 41 provided in the data server 4 are thus enabled to perform bidirectional communication therebetween. In addition, about the form of the bidirectional communication, the same form as the bidirectional communication between the tire-side device 1 and the general-purpose communication device 2 may be applied.

The storage unit 42 includes an information storage unit 42a, a first software storage unit 42b and a second software storage unit 42c. The information storage unit 42a, the first software storage unit 42b and the second software storage unit 42c are the same as the information storage unit 24a, the first software storage unit 24b and the second software storage unit 24c provided in the second embodiment, respectively.

Thus, the data server 4 is provided separately from the general-purpose communication device 2. Thereby, when the tire ID is transmitted from the tire-side device 1 or when the user inputs the tire ID through the display unit 23, the general-purpose communication device 2 performs data communication with the data server 4 and downloads various information corresponding to the tire ID. That is, the general-purpose communication device 2 downloads the software for determining the road surface condition and the software for detecting the tire air pressure from the data server 4, in addition to the tire information, the support vector for each tire ID and the threshold value for detecting the tire air pressure decrease.

As described above, even when various types of information for each tire ID are downloaded from the data server 4 to the general-purpose communication device 2, the road surface condition is determined based on an appropriate support vector for each tire ID, or an appropriate threshold value is set. Based on this, it is possible to detect the tire air pressure decrease. In this case, the general-purpose communication device 2 only needs to store information corresponding to the tire ID of the tire 3, to which the tire-side device 1 is attached, and need not store other information for each tire ID. Therefore, the amount of data stored in the general-purpose communication device 2 can be reduced.

Other Embodiment

Although the present disclosure is made with reference to the embodiments described above, the present disclosure is not limited to such embodiments but may include various changes and modifications which are within equivalent ranges. In addition, various combinations and forms, and further, other combinations and forms including only one element, or more or less than these elements are also within the scope and the scope of the present disclosure.

(1) For example, in the above embodiments, the vibration sensor unit 11 and the air pressure sensor unit 12 are exemplified as the sensing unit for detecting the road surface condition and the tire air pressure related to the tire. However, the sensing unit need not include both sensor units but may include either one. Further, regarding the condition related to the tire, other conditions such as a load applied to each road wheel or a wear of the tire 3, which are different from the road surface condition or the tire air pressure may be transmitted to the general-purpose communication device 2.

Regarding the load, for example, the ground contact zone is calculated based on a time period required for one rotation of the tire determined from a time period of the contact zone and the rotation speed of the tire 3, and then calculated from an area ratio of the contact areas of four road wheels. The ground contact zone means an area of a part of the tread 31 of the tire 3, which corresponds to the location of attachment of the vibration sensor 11 and contacting the road surface. The period between the first peak value and the second peak value of the detection signal of the vibration sensor unit 11 corresponds to the ground contact zone. Further, since the output voltage waveform corresponding to the ground contact zone appears once every time the tire 3 makes one rotation, the time interval between the first peak values or between the second peak values is the time period required for one rotation of the tire 3. For this reason, by calculating the contact area of each road wheel based on a size of the tire 3, the time period required for one rotation of the tire and the time period of the portion corresponding to the contact zone, the load applied to each of the four road wheels is detected based on the area ratio.

Therefore, by transmitting data such as the rotation speed of the tire 3 and the time period during which the tire 3 is in contact with the ground to the general-purpose communication device 2 as data related to the load from the tire-side device 1, the user can recognize through the general-purpose communication device 2 the load applied to each road wheel. The load itself may be displayed on the display unit 23 of the general-purpose communication device 2. However, since it is possible to determine whether the vehicle is in an overloaded condition or unbalanced loading condition based on the load, these conditions may be displayed. For example, it is possible to display an overloaded condition indicating that the load exceeds a predetermined threshold value, or the loading imbalance indicating that a difference of loading between left and right exceeds a predetermined threshold value.

With respect to the wear level, for example, the general-purpose communication device 2 may acquire map information and present position information of the vehicle and calculate the travel distance of the vehicle based on the acquired information, so that the wear level may be calculated from the travel distance and the rotation speed of the tire 3. That is, in case the depth of the groove formed in the tread 31 of the tire 3 changes, the circumference of the tire 3 becomes smaller. The number of rotations of the tire 3 increases after wearing than before wearing for the same travel distance. For this reason, it is possible to calculate the wear level of the tire 3 based on a difference between the travel distance, which is calculated based on the map information and the present position information, the travel distance, which is estimated based on the rotation speed of the tire 3 included in the data related to the wear level and the tire diameter.

In addition, when the vehicle travels, the tire 3 is deformed by the load applied to each wheel, and the tire 3 is deformed in correspondence to the tire air pressure. Therefore, it is possible to calculate more accurately the wear level by correcting the rotation speed of each tire 3 or the travel distance of the vehicle, which is estimated based on the rotation speed, based on the load of the tire calculated as described above and the tire air pressure.

Therefore, by transmitting such data such as the rotation speed of the tire 3 to the general-purpose communication device 2 as data related to the wear level from the tire-side device 1, the user can recognize the wear level of the tire 3 through the general-purpose communication device 2. The display form of the wear level by the display unit 23 may be variously determined. For example, the wear level may be indicated as small or large, or may be indicated as a travel distance which can be made as a guide until tire replacement is needed.

(2) In addition, in the information storage unit 24a of the general-purpose communication device 2 and the information storage unit 42a of the data server 4, information other than various types of tire information, support vectors, and information related to the threshold value for determining the decrease of the tire air pressure may be stored. For example, a correction coefficient for the tire air pressure or the threshold value, a correction coefficient for correcting the wear level, and the like can be given.

The correction coefficient for the tire air pressure or the threshold value may be used when the determination standard for the tire air pressure decrease is changed for each type of tire. That is, by multiplying the tire air pressure or the threshold value by the correction coefficient, the determination reference level of the tire air pressure decrease is changed according to the type of the tire 3. For example, the coefficient may be used to detect the tire air pressure decrease with less tire air pressure decrease. Further, it is preferable that the decrease in the tire air pressure is determined from a higher value of the tire air pressure in case the load on each wheel is large, such as when the quantity of loading or the number of passengers is large. For this reason, it is possible to determine the tire air pressure decrease in correspondence to the load by setting the correction coefficient for the tire air pressure or the threshold value for each type of tire 3 in correspondence to the load.

As for the correction coefficient for the tire wear level, in case the detection of the wear level is performed at every predetermined measured distance, the measurement distance may be changed in correspondence to the type of tire 3 by multiplying a reference distance by the correction coefficient. For example, the reference distance may be set based on a radial tire. In case of a tire such as a winter tire that is soft and easy to wear, the measured distance may be made shorter than the reference distance by multiplying the reference distance by the correction coefficient.

(3) Further, the general-purpose communication device 2 may be configured to enable the user to input the vehicle information therethrough. For example, the display unit 23 may be configured as a touch panel type liquid crystal display to enable inputting of the vehicle information therethrough. The vehicle information includes the number of passengers and road information of a traveling schedule, for example, use of an expressway. By inputting these to the general-purpose communication device 2, it is possible to appropriately correct the condition related to the tire.

For example, if the number of passengers is large, the load increases and the tire air pressure increases. For this reason, similarly to the above, it is preferable to be able to determine the decrease in tire air pressure from a higher value of the tire air pressure. In this case, the tire air pressure or the threshold value is corrected by multiplying the tire air pressure or the threshold value by the correction coefficient.

In case the vehicle is scheduled to travel on an expressway, it is preferable to set the tire air pressure higher for the expressway than on a general road. Therefore, also in this case, by performing a correction of the tire air pressure or the threshold value by the correction coefficient, it is possible to determine the tire air pressure decrease from a higher value of the tire air pressure.

(4) Further, it is preferable that the tire-side device 1 be switched to a sleep state during a vehicle stop to reduce power consumption. However, in this case, the tire-side device 1 may not respond even if a request signal is output from the general-purpose communication device 2 to the tire-side device 1 while the vehicle is stopped. The general-purpose communication device 2 may not be able to receive data on the tire air pressure.

Therefore, in such a case, it is advisable to apply vibration to the tire 3 to simulate the same state as when the vehicle starts to move and so that the signal processing unit 13 is set to the wake-up state. Thus, data on the tire air pressure can be transmitted from the tire-side device 1 to the general-purpose communication device 2.

(5) In the above embodiment, the acceleration sensor is used as the vibration sensor unit 11 which constitutes the vibration detection unit. However, other elements that can detect vibration, for example, a piezoelectric element may be used as the vibration detection unit.

(6) Further, in the above embodiment, data including the characteristic value is used as the road surface data indicating the road surface condition appearing in the detection signal of the vibration sensor unit 11. However, this is only one example, and other data may be used as the road surface data. For example, integrated value data of the vibration waveform of each of the five regions R1 to R5 included in the vibration data of one rotation of the tire 3 may be used as the road surface data, or raw data of the detection signal itself may be used as the road surface data.

(7) In the above embodiment, the general-purpose communication device 2 is configured to notify the user of the road surface condition on the traveling road surface of the vehicle, but it is not necessary to display all the road surface conditions. For example, the user may be notified through the general-purpose communication device 2 only on a slippery road surface such as a frozen road or a snow-covered road that requires special attention to travel.

What is claimed is:

1. A tire system comprising:
a tire-side device provided in each of plural tires of a vehicle; and
a general-purpose communication device used as a device provided separately from the tire of the vehicle and provided with a function of performing a notification of a tire-related condition by installing a program for determining a road surface condition and detecting a tire air pressure, wherein:
the tire-side device includes a sensing unit for outputting a detection signal corresponding to the tire-related condition, a signal processing unit for processing the detection signal of the sensing unit and generating data indicating the tire-related condition, and a first data communication unit for performing data communication with the general-purpose communication device and transmitting the data indicating the tire-related condition generated by the signal processing unit; and
the general-purpose communication device includes a second data communication unit for performing communication with the tire-side device and receiving the data indicating the tire-related condition, a control unit for acquiring the tire-related condition based on the data indicating the tire-related condition, and a notification unit for performing notification of the tire-related condition acquired by the control unit, wherein:
the sensing unit includes a vibration sensor unit for outputting a detection signal corresponding to a vibration of the tire as the detection signal corresponding to the tire-related condition;
the signal processing unit generates road surface data indicating a road surface condition, which appears in a waveform of the detection signal corresponding to the vibration of the tire as the data indicating the tire-related condition;
the control unit determines the road surface condition of a road surface of the vehicle travel as the tire-related condition
the general-purpose communication device includes a third data communication unit;
the control unit performs data communication with a data server through the third data communication unit;
the data server includes a fourth data communication unit for performing data communication with the third data communication unit, an information storage unit for storing information including tire information of each tire ID as individual identification information of the tire and a support vector for each tire ID, and a software storage unit for storing software that is used to determine the road surface condition of a road surface of the vehicle travel based on the road surface data; and
the control unit downloads the software stored in the software storage unit and the information corresponding to the tire ID of the tire, to which the tire-side device is provided, among the information stored in the information storage unit, and determines the road surface condition of the road surface of the vehicle travel as the tire-related condition based on the tire information and the support vector corresponding to the tire ID of the tire and the software that is downloaded from the data server.

2. The tire system according to claim 1, wherein:
the sensing unit includes an air pressure sensor unit for outputting a detection signal corresponding to a tire air pressure as the detection signal corresponding to the tire-related condition;
the signal processing unit generates data related to the tire air pressure based on the detection signal corresponding to the tire air pressure as the data indicating the tire-related condition; and
the control unit calculates the tire air pressure or detects a tire air pressure decrease as the tire-related condition based on the data related to the tire air pressure.

* * * * *